United States Patent
Slavin et al.

(10) Patent No.: US 10,612,960 B1
(45) Date of Patent: Apr. 7, 2020

(54) CONNECTED SCALE DEVICE

(71) Applicant: Alarm.com Incorporated, Tysons, VA (US)

(72) Inventors: Alison Jane Slavin, Falls Church, VA (US); Bret Jutras, Sterling, VA (US); Aaron Lee Roberts, Centreville, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/383,866

(22) Filed: Apr. 15, 2019

Related U.S. Application Data

(63) Continuation of application No. 15/951,952, filed on Apr. 12, 2018, now Pat. No. 10,267,668.

(60) Provisional application No. 62/484,436, filed on Apr. 12, 2017.

(51) Int. Cl.
*G01G 19/00* (2006.01)
*G06Q 10/08* (2012.01)
*G08B 13/14* (2006.01)

(52) U.S. Cl.
CPC ....... *G01G 19/005* (2013.01); *G06Q 10/0832* (2013.01); *G06Q 10/0833* (2013.01); *G08B 13/1472* (2013.01)

(58) Field of Classification Search
CPC ......... G01G 19/005; G01G 19/00–007; G06Q 10/0832; G06Q 10/0833; G06Q 30/0639; G08B 13/1472; A47G 29/141; G07B 2017/00209
USPC ....................................................... 340/568.1
See application file for complete search history.

(56) References Cited

U.S. PATENT DOCUMENTS

| | | | |
|---|---|---|---|
| 5,624,071 A | 4/1997 | Sosan | |
| 5,921,117 A | 7/1999 | Illguth | |
| 6,138,910 A | 10/2000 | Madruga | |
| 6,155,715 A | 12/2000 | Lake et al. | |
| 6,344,796 B1 * | 2/2002 | Ogilvie | A47G 29/141 340/5.2 |
| 6,690,997 B2 * | 2/2004 | Rivalto | G06Q 10/08 700/237 |
| 6,845,909 B2 * | 1/2005 | Bong | G06Q 10/087 235/375 |
| 6,866,195 B2 * | 3/2005 | Knowles | G06Q 10/087 235/375 |
| 9,244,147 B1 | 1/2016 | Soundararajan et al. | |
| 9,508,239 B1 * | 11/2016 | Harrison | G08B 13/2462 |
| 2001/0045180 A1 | 11/2001 | McCormick et al. | |
| 2002/0162883 A1 | 11/2002 | Arvonio et al. | |
| 2008/0121682 A1 | 5/2008 | Grim et al. | |

(Continued)

*Primary Examiner* — Eric Blount
(74) *Attorney, Agent, or Firm* — Fish & Richardson P.C.

(57) ABSTRACT

A monitoring system that is configured to monitor a property includes a connected scale device that is configured to receive a package, determine a weight of the package, and after determining the weight of the package, arm the connected scale device, and a monitoring control unit that is configured to receive, from the connected scale device, data indicating that the connected scale device received the package and the connected scale device is armed, and based on receiving the data indicating that the connected scale device received the package and the connected scale device is armed, communicate, to a user device of a resident of the property, a notification indicating that the connected scale device received the package.

20 Claims, 6 Drawing Sheets

(56) References Cited

U.S. PATENT DOCUMENTS

| | | | |
|---|---|---|---|
| 2014/0008246 A1 | 1/2014 | Pfeiffer | |
| 2015/0310381 A1* | 10/2015 | Lyman | G06Q 10/083 705/330 |
| 2015/0356801 A1 | 12/2015 | Nitu et al. | |
| 2016/0180667 A1* | 6/2016 | Bunker | G08B 13/19613 382/103 |
| 2017/0011605 A1* | 1/2017 | Grabham | G08B 13/1472 |
| 2017/0091711 A1 | 3/2017 | Akselrod | |

* cited by examiner

CONNECTED SCALE DEVICE

CROSS REFERENCE TO RELATED APPLICATION

This application is a continuation of U.S. application Ser. No. 15/951,952, filed Apr. 12, 2018, now allowed, which claims the benefit of U.S. Provisional Application No. 62/484,436, filed Apr. 12, 2017, and titled "Package Scale Device." Both of these prior applications are incorporated by reference in their entirety.

TECHNICAL FIELD

This disclosure relates to property monitoring technology.

BACKGROUND

Many people equip homes and businesses with monitoring systems to provide increased security for their homes and businesses.

SUMMARY

Techniques are described for monitoring technology. For example, techniques are described for integrating a connected scale device into a monitoring system to allow for monitoring packages that are delivered to a monitored property.

According to an innovative aspect of the subject matter described in this application, a monitoring system that is configured to monitor a property includes a connected scale device that is configured to receive a package, determine a weight of the package, and after determining the weight of the package, arm the connected scale device. The monitoring system includes a monitoring control unit that is configured to receive, from the connected scale device, data indicating that the connected scale device received the package and the connected scale device is armed, and based on receiving the data indicating that the connected scale device received the package and the connected scale device is armed, communicate, to a user device of a resident of the property, a notification indicating that the connected scale device received the package.

These and other implementations each optionally include one or more of the following optional features. The monitoring control unit is further configured to receive, from an external server, shipping data that specifies the weight of an item that is expected to be delivered to the property, receive, from the connected scale device, data indicating the weight of the package, compare the weight of the package to the weight of the item that is expected to be delivered to the property, determine that the weight of the package is within a threshold weight of the weight of the item that is expected to be delivered to the property, and where the notification further indicates that the package is likely the item that is expected to be delivered to the property. The connected scale device is configured to receive, from the monitor control unit, the shipping data that specifies the weight of the item that is expected to be delivered to the property, detect a person approaching the connected scale device, and output an audible message indicating instructions for delivering the item that is expected to be delivered to the property based on (i) detecting the person approaching the connected scale device and (ii) receiving the shipping data that includes the weight of the item that is expected to be delivered to the property.

The monitoring control unit is configured to receive a disarm code, compare the disarm code to a stored disarm code, and disarm the connected scale device based on the received disarm code matching the stored disarm code. The monitoring control unit is configured to compare the received disarm code to the stored disarm code by comparing the received disarm code to a disarm code that disarms the monitoring system while the monitoring system is in an armed state, and disarm the connected scale device based on the received disarm code matching the disarm code that disarms the monitoring system while the monitoring system is in an armed state. The monitoring control unit is configured to compare the received disarm code to the stored disarm code by comparing the received disarm code to a disarm code that disarms the connected scale device and that does not disarm the monitoring system while the monitoring system is in an armed state, and disarm the connected scale device based on the received disarm code matching the disarm code that disarms the connected scale device and that does not disarm the monitoring system while the monitoring system is in an armed state. The connected scale device is configured to receive by a monitor control unit of the monitoring system, the disarm code. The monitoring control unit is configured to receive from a monitoring system application running on the user device of the resident of the property, the disarm code.

The monitoring control unit is configured to receive a biometric identifier, compare the received biometric identifier to a stored biometric identifier, and disarm the connected scale device based on the received biometric identifier matching the stored biometric identifier. The monitoring control unit is configured to receive a biometric identifier by, receiving, at a finger print scanner, a finger print, compare the received biometric identifier to a stored biometric identifier by comparing the received finger print to a stored finger print, and disarm the connected scale device based on the received biometric identifier matching the stored biometric identifier by disarming the connected scale device based on the received finger print matching the stored finger print. The monitoring control unit is configured to receive biometric identifier by, receiving from a camera in the vicinity of the connected scale device, an image, compare the received biometric identifier to a stored biometric identifier by comparing the received image to a stored image, and disarm the connected scale based on the received biometric identifier matching the stored biometric identifier by disarming the connected scale device based in the received image matching the stored image The monitoring control unit is configured to receive biometric identifier by, receiving, at microphone, a voice sample, compare the received biometric identifier to a stored biometric identifier by comparing the received voice sample to a stored voice sample, and disarm the connected scale device based on the received biometric identifier matching the stored biometric identifier by disarming the connected scale device based on the received voice sample matching the stored voice sample. The connected scale device is configured to detect a short-range radio device in a vicinity of the connected scale device, and determine that the short range radio device is a known short-range radio device, and the monitoring control unit it configured to receive, from the connected scale device, data indicating that the connected scale device detected the known short-range radio device, and based on receiving data indicating that the connected scale device detected the known short-range radio device, disarm the connected scale device. The short-range radio device may be a Bluetooth capable device.

The connected scale device is configured to determine that the connected scale device is located outside of a threshold distance of the property, and generate an audible alarm based on determining the connected scale device is located outside of the threshold distance of the property. The connected scale device is configured to detect a change in a weight reading of the connected scale device for a period of time, determine that the change in the weight reading satisfies a weight threshold, determine that the period of time satisfies a time threshold, and based on determining that the change in the weight reading satisfies the weight threshold and determining that the period of time satisfies the time threshold, generate an alarm.

The connected scale device is configured to communicate, to the monitor control unit, data indicating the alarm generated based on determining that the change in the weight reading satisfies the weight threshold and determining that the period of time satisfies the time threshold, and the monitor control unit is configured to receive, from the connected scale device, the data indicating that the alarm, and based on receiving the data indicating the alarm, perform an action.

The monitor control unit it configured to perform an action by flashing one or more lights on or off. The monitor control unit is configured to perform an action by deploying an autonomous drone to search an area around the property, and the drone includes a camera that is configured to capture image data, and is configured to communicate the captured image data to the monitor control unit. The connected scale device is configured to receive an additional package while the connected scale device is armed and the package is on the connected scale device, determine a weight of the second package and the package, and the monitoring control unit is configured to, receive, from the connected scale device, data indicating that the connected scale device received the additional package, and based on receiving data indicating that the connected scale received the additional package, communicate, to the user device of the resident of the property, a notification indicating that the connected scale device received the additional package.

The monitoring control unit is configured to receive, from the connected scale device, data indicating the change in the weight reading of the connected scale device for the period of time, receive weather data for the period of time and for an additional period between the weight reading change and receipt of the package, based on the weather data for the period of time and for the additional period between the weight reading change and the receipt of the package, determine that weather likely caused the change in the weight reading, and based on determining that the weather likely causes the change in the weight reading, deactivating the alarm. The monitoring control unit is configured to based on the alarm, generate and transmit an instruction for a camera in a vicinity of the connected scale device to capture image data.

The connected scale device is configured to detect a change in a weight reading of the connected scale device for a period of time, determine that the change in the weight reading does not satisfies a weight threshold or that the period of time does not satisfy a time threshold, and based on determining that the change in the weight reading does not satisfy the weight threshold or determining that the period of time does not satisfy the time threshold, maintain an armed state without generating an alarm.

According to another innovative aspect of the subject matter described in this application, a computer implemented method includes receiving, by a connected scale device, a package, determining, by the connected scale device, a weight of the package, and after determining the weight of the package, arming the connected scale device, and communicating, by the connected scale device, a notification indicating that the connected scale device received the package.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for integrating a connected scale device into a monitoring system to allow for the secured delivery of packages to a monitored property. A connected scale device may be located in an area to the exterior of the monitored property, and may be weather resistant to ensure reliable performance during extreme temperatures, wind, and precipitation. The connected scale device may have a large surface area to accept equally large packages. When packages are delivered to the monitored property and placed on the connected scale device, the scale detects the weight of the package, and arms the connected scale device. The connected scale device monitors the weight on the scale for any changes to ensure the security of the package until the scale is disarmed and package is retrieved by a user associated with the monitored property.

Figure 1:
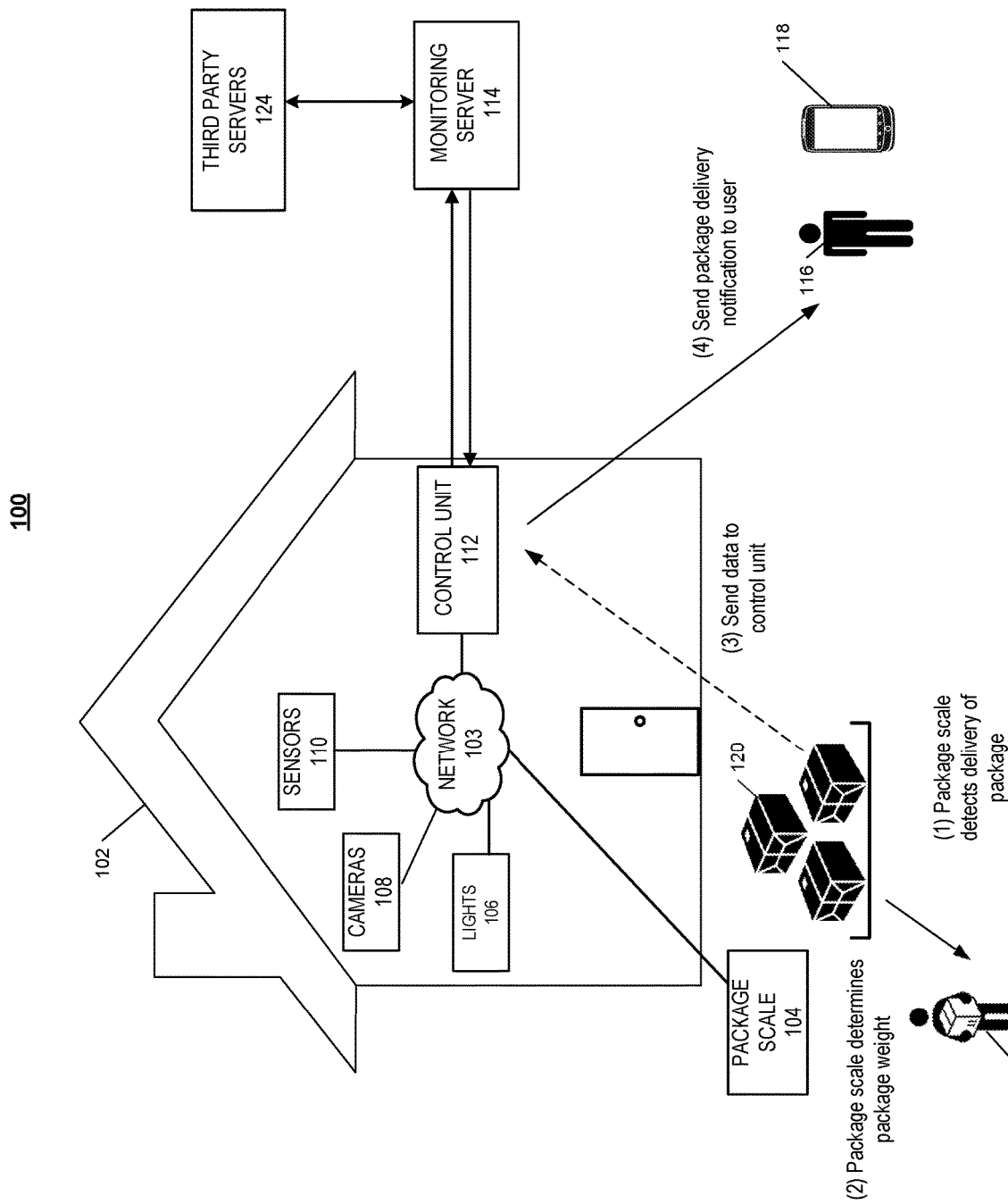
FIG. 1 illustrates an example of a system for delivering a package on a connected scale device at a monitored property.

FIG. 1 illustrates an example of a monitoring system 100 integrated with a connected scale device 104. As shown in FIG. 1, a property 102 (e.g. a home) of a user 116 is monitored by an in-home monitoring system (e.g. in-home security system) that includes components that are fixed within the property 102. The in-home monitoring system may include a control unit 112, one or more sensors 110, one or more cameras 108, one or more lights 106, and a connected scale device 104. The user 116 may integrate the connected scale device 104 into the in-home monitoring system to monitor the packages delivered to the monitored property 102 when the user 116 may be away or otherwise unavailable to accept a package. The connected scale device 104 may be placed at an area on the exterior of the monitored property 102 in the sight of a delivery man 122. For example, the connected scale device 104 may be placed on the side of the front door of the property 102.

In the example shown in FIG. 1, a delivery man 122 may approach the monitored property 102 to deliver one or more packages 120. The connected scale device 104 may be marked with signage that instructs the delivery man 122 to place deliveries on the scale. The signage may also indicate to prospective thieves that the packages are being monitored, and if removed from the scale before disarming, an alarm will sound. In some examples, the connected scale device 104 may be equipped with a motion sensor that may detect when someone approaches the connected scale device 104, and based on the detected motion, the connected scale device 104 may output an audible message indicating that deliveries should be placed on the connected scale device. In some other examples, the connected scale device 104 may be equipped with a camera that may detect a person approaching the monitored property 102, and may prompt the speaker of the connected scale device 104 to output an audible message.

The delivery man 122 may place the one or more packages 120 on the connected scale device 104, and the connected scale device 104 may determine the weight of the one or more packages 120. The connected scale device 104 may be any appropriate type of scale than can accurately measure the weight of items placed on the scale. For example, the scale may be an analog or digital scale, or may be a spring balance or load cell spring. In some implementations, the connected scale device 104 changes to an armed status when one or more packages 120 are placed on the scale. In these implementations, the connected scale device 104 communicates the weight of the one or more delivered packages to the control unit 112, and the control unit 112 may instruct the connected scale device to switch to the armed state. An LED status indicator on the connected scale device 104 may light red to indicate that the connected scale device is armed.

In some implementations, the connected scale device 104 may be equipped with a button that can be used to initiate two-way voice conversations. In these implementations, when the delivery man 122 places a package on the connected scale device 104, the delivery man 122 may press the button to initiate a two-way conversation with the user 116. The delivery man 122 may communicate the delivery of the package to the user 116. The button on the connected scale device 104 may also be configured to initiate a video connection.

The control unit 112 may communicate a package receipt notification to the user device 118 of the user 116. The package receipt notification may include the time of the delivery, and the determined weight of the package. In some implementations, the package receipt notification may include shipper and sender details. For example, the package receipt notification may indicate that the air filters ordered from Internet seller have been delivered by UPS, and the package weighs 3 lbs. In these implementations, the monitoring server 114 may receive data from one or more third party servers 124 through API integration. The monitoring server 114 may be located remotely from the monitored property, and may be in communication with several other control units that manage the in-home monitoring systems of several properties. The monitoring server 114 may receive sender information from third party servers 124 such as, sender servers, and shipper servers. The package receipt notification may be communicated to the user device 118 as a text message, SMS message, or through an in-app message.

The connected scale device 104 remains in the armed state until the user 116 disarms the connected scale device 104 to retrieve the packages 120. In some examples, the connected scale device 104 may have a panel that allows a user to enter a disarm code. The panel may include a keypad, a fingerprint scanner, or a retina scanner. The user 118 may disarm the connected scale device 120 by entering a unique user access code on the keypad, and may then access the one or more packages 120 without triggering the alarm. The user access code may be the same code used to disarm the in-home monitoring system, or may be a different user access code. In some examples, the user 116 may disarm the in-home monitoring system at the monitored property 102, and the connected scale device 104 may automatically disarm based on the status of the in-home monitoring system. In these examples, the arming state of the connected scale device 104 may depend on the arming state of the in-home monitoring system. For example, the connected scale device 104 may be in an armed state once the in-home monitoring system is in an armed state, whether a package is delivered on the scale or not.

In some implementations, the arming state of the connected scale device 104 may be based on the location of the one or more users associated with the monitored property 102. The connected scale device 104 may be in an armed state when, based on the GPS location of the use devices associated with each user determines that each of the users are outside of the monitored property. The status of the connected scale device 104 may be based on a user configurable schedule. For example, the user may set a schedule based on whether the user is expecting a package or not. In other examples, the connected scale device 104 status may be automated based on receiving data through API integration with the shipper and or sender of the package. For example, the connected scale device may be in an armed state when the connected scale device receives data from FedEx indicating that a package is out for delivery.

In some examples, the user 116 may disarm the connected scale device 104 by entering a user access code into a connected door lock. For example, the front door of the monitored property 102 may be a connected door lock, and the user may unlock the door with a user code that simultaneously unlocks the connected scale device 104. The user 116 may disarm the connected scale device 104 based on a biometric authentication. The user 116 may use the finger print scanner, or retina scanner to disarm the connected scale device. In some implementations, the finger print scanner and the retina scanner may be on the connected scale device. In other implementations, the finger print scanner and the retina scanner may be located on the control panel for the in-home monitoring system. The connected scale device may be disarmed using facial recognition enabled through a front door knob camera.

In some examples, the connected scale device 120 may be disarmed by voice recognition authentication. In these examples, the user 116 may speak the user access code into the speaker on the connected scale device 104 to disarm the scale. In some other examples, the connected scale device 104 may automatically disarm when the user device 118 is in close proximity to the scale. For example, the user device 118 may connect to the connected scale device 104 via Bluetooth and lead to the automatic disarming of the scale. The user 116 may disarm the connected scale device 104 remotely by sending a command through a native application on the user device 118. For example, the user may not be expected back to the monitored property for a long period, and may want a neighbor to retrieve the delivered packages. The user 116 may disarm the connected scale device and the scale would be disarmed for a set period of time for the neighbor to retrieve the packages.

In some implementations, the property 102 may not be monitored by an in-home monitoring system. In such examples, the location of the connected scale device 104 is constantly monitored by a GPS tracker associated with the scale. The GPS tracker may communicate its location to a central server that administers over several other connected scale devices to constantly monitor the connected scale device. When a package is delivered on the connected scale device, the device may communicate the receipt of delivery to a central server, which in turn generates a notification to the user. The user may receive the notifications through an application used to track and monitor the connected scale devices associated with a particular user. The GPS tracker associated with the connected scale device may be used to determine when the connected scale device is being removed from the property. The connected scale device 104 may be configured with a geofence that limits the distance the connected scale device 104 can be moved from the property before an alarm is generated. The connected scale device 104 may generate an audible alarm when moved beyond the threshold distance of the geofence. If the connected scale device is stolen from the property, the GPS tracker can be used by law enforcement to locate the device.

The connected scale device 104 may send a notification to the user device 118 of the user 116 associated with the monitored property 102. The connected scale device 104 may generate the notification based on determining that the delivered one or more packages have been left on the scale for an extended time period. The time period may be a time period set by the user 116, or in some examples, the time period may be dynamically determined based one data received by the monitoring server 114. The notification may be sent as an SMS text, an email, or any other suitable method. The notification may include the details of the package such as weight, time of delivery, sender information, shipper information, and time spent on the scale. In some implementations, the notification may include one or more pictures or video recordings of package which was captured by one or more cameras near the connected scale device 104. The user 116 may respond to the notification to remotely disarm the connected scale device to allow a friend or neighbor to retrieve the package.

The in-home monitoring system that incorporates the connected scale device may use the API integration with the third party servers 124 of the shippers, such as Amazon, WayFair, Target, etc., and servers of the shipping companies, such as FedEx and UPS, to enable the sharing of information to improve the effectiveness of the system for securing packages. The data provided by the third parties may include, weight, dimensions, materials, contents, date of shipment, if fragile, if perishable (and any details about its perishable time frame), if frozen (and any details about its frozen timeframe), if toxic/hazmat, approximate value, if carrying live plants or animals, etc. The data could also include information about the expected time frame for delivery, the actual time of delivery, confirmation of delivery, and any other additional delivery data. The control unit at the monitored property 102 may share information with the monitoring server 114 which in turn may share the data with the third party servers 124. Information such as, confirmation that a package matching the weight and delivery timeframe characteristics of a package reported by the third party was received on the connected scale, along with later confirmation that the package was successfully retrieved by an authorized user, or notification that the package was stolen. If a package was stolen, the control unit 112 may also share details about the theft with the monitoring server 114 and in turn the third party server 124.

The data could be used to determine the probability of packages being stolen in specific neighborhoods, apartment buildings, city blocks, zip codes etc., and could be used by the systems to determine whether or not to leave a package at an unmonitored property, or may be used by the in-home monitoring system to increase security. For example, the monitoring system may eliminate an alarm delay in areas with high theft. The system may also increase the priority for packages that are perishable or frozen or containing live plants or animals by decreasing the time period for sending a notification to the user.

Figure 2:
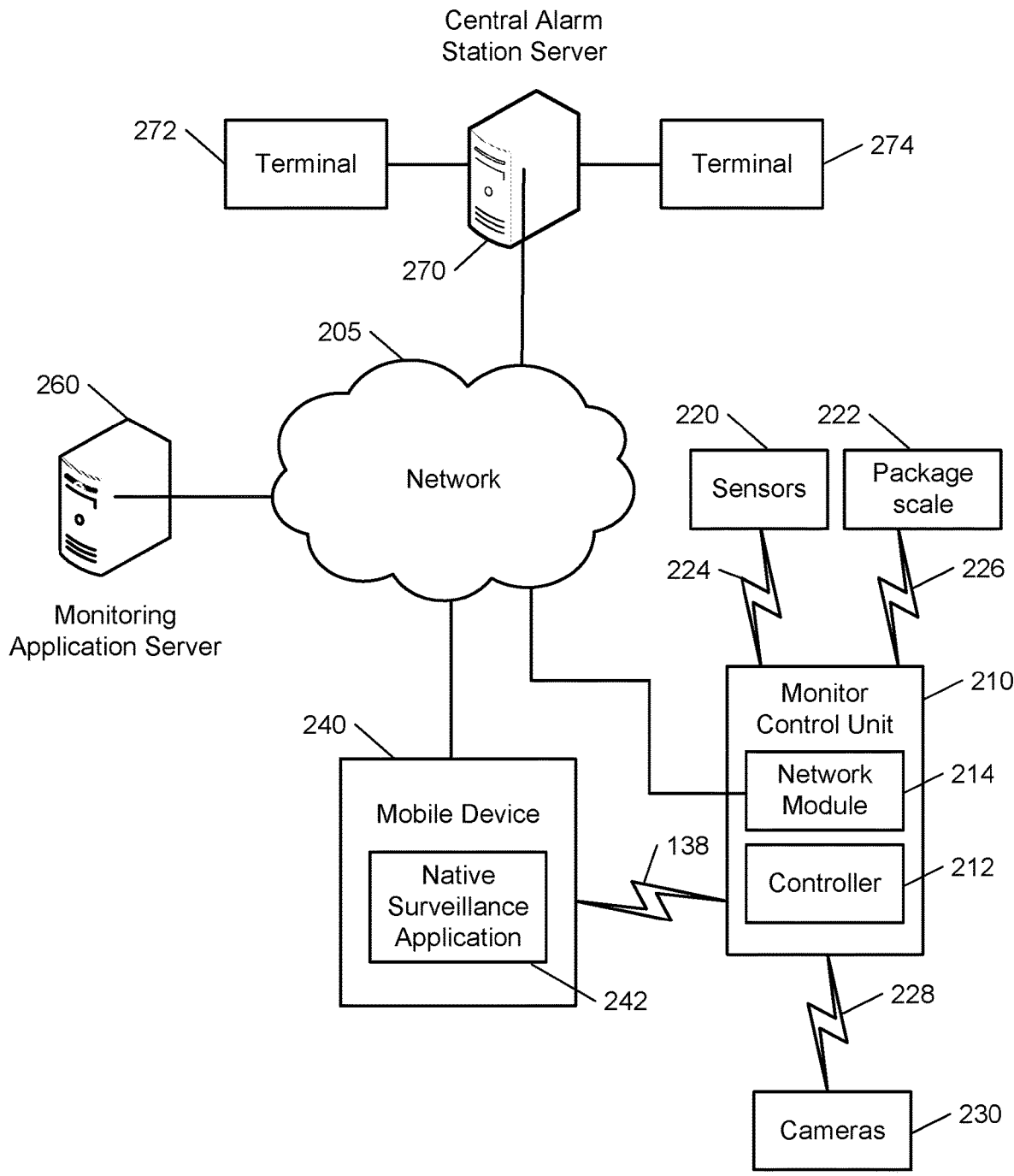
FIG. 2 illustrates an example of a monitoring system integrated with a connected scale device.

FIG. 2 illustrates an example of a system 200 configured to monitor a property. The system 200 includes a network 205, a monitoring system control unit 210, one or more user devices 240, a monitoring application server 260, and a central alarm station server 270. The network 205 facilitates communications between the monitoring system control unit 210, the one or more user devices 240, the monitoring application server 260, and the central alarm station server 270. The network 205 is configured to enable exchange of electronic communications between devices connected to the network 205. For example, the network 205 may be configured to enable exchange of electronic communications between the monitoring system control unit 210, the one or more user devices 240, the monitoring application server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from indoor door knobs, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include a connected scale device 222. The connected scale device 222 may include an electronic sensor that allows the connected scale device to communicate with the monitor control unit 210. In some implementations, the connected scale device 222 may communicate with the monitor control unit 210 through Zwave, Zigbee, BLE, LoRA, LPWan, GSM, CDMA, LTE, Wi-Fi, Powerline, PoE, Ethernet, other wireline, proprietary 900 Mhz/2.4 Gz/other radio frequency, or any other suitable method of communication.

The connected scale device 222 may be shaped as a square or rectangular receptacle, and may be available in one or more different styles and colors. The connected scale device 222 may have a paintable surface that may be painted by the user to match the exterior of the monitored property. The connected scale device may be an analog, digital, spring balance, or load cell scale that can reliably measure weight of an object placed on the scale. The connected scale device 222 may include an LED status indictor. The status indicator LED may light red when a package is delivered on the scale, may light green when the scale is expecting a package, and may light yellow to indicate low power levels. The status indicator may be configured by the user to light one or more different colors to indicate one or more other statuses.

The connected scale device 222 may be battery powered by a one-time use battery or a rechargeable battery. In some examples, the connected scale device 222 may be configured with one or more solar panels to allow the scale to absorb solar energy to power the device. In some other examples, where the scale is a spring load type scale, the scale may be powered by the force of the packages being placed on the scale. For example, the compression and decompression of the spring of the scale may be converted to power for the scale. The connected scale device may not require large amount of power since the scale is in an idle mode unless awakened by a change in weight. When the connected scale device is in idle mode, the scale would turn off the unused processors, sensors, and transmitting radio to reserve power. The connected scale device may be configured to perform self-diagnostic maintenance. For example, the connected scale device may be able to communicate to the control unit when the battery is running or, or when one or more components of the connected scale device are malfunctioning. The connected scale device may include a key pad, a fingerprint scanner, retina scanner, cameras, speakers, and or other electronic sensors. The connected scale device may include a GPS tracker, an accelerometer, and or a gyroscope to monitor the location and or movement of the scale.

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The one or more cameras 230 may be triggered by several different types of techniques. For instance, a Passive Infra Red (PIR) motion sensor may be built into the one or more cameras 230 and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 214, etc.) to improve image quality when the scene is dark. An integrated or separate light sensor may be used to determine if illumination is desired and may result in increased image quality.

The sensors 220, the connected scale device 222, and the cameras 230 communicate with the controller 212 over communication links 224, 226, and 228. The communication links 224, 226, and 228 may be a wired or wireless data pathway configured to transmit signals from the sensors 220, the package holder devices 222, and the cameras 230 to the controller 212. The communication link 224, 226, and 228

228 may include a local network, such as, 802.11 "Wi-Fi" wireless Ethernet (e.g., using low-power Wi-Fi chipsets), Z-Wave, Power Over Ethernet (POE), Zigbee, Bluetooth, "HomePlug" or other Powerline networks that operate over AC wiring, and a Category 5 (CATS) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 140 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

The central alarm station server 270 is connected to multiple terminals 272 and 274. The terminals 272 and 274 may be used by operators to process alarm events. For example, the central alarm station server 270 may route alarm data to the terminals 272 and 274 to enable an operator to process the alarm data. The terminals 272 and 274 may include general-purpose computers (e.g., desktop personal computers, workstations, or laptop computers) that are configured to receive alarm data from a server in the central alarm station server 270 and render a display of information based on the alarm data. For instance, the controller 212 may control the network module 214 to transmit, to the central alarm station server 270, alarm data indicating that a sensor 220 detected a door opening when the monitoring system was armed. The central alarm station server 270 may receive the alarm data and route the alarm data to the terminal 272 for processing by an operator associated with the terminal 272. The terminal 272 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 272 and 274 may be mobile devices or devices designed for a specific function. Although FIG. 2 illustrates two terminals for brevity, actual implementations may include more (and, perhaps, many more) terminals.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bolt, Lora, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication.

Figure 3:
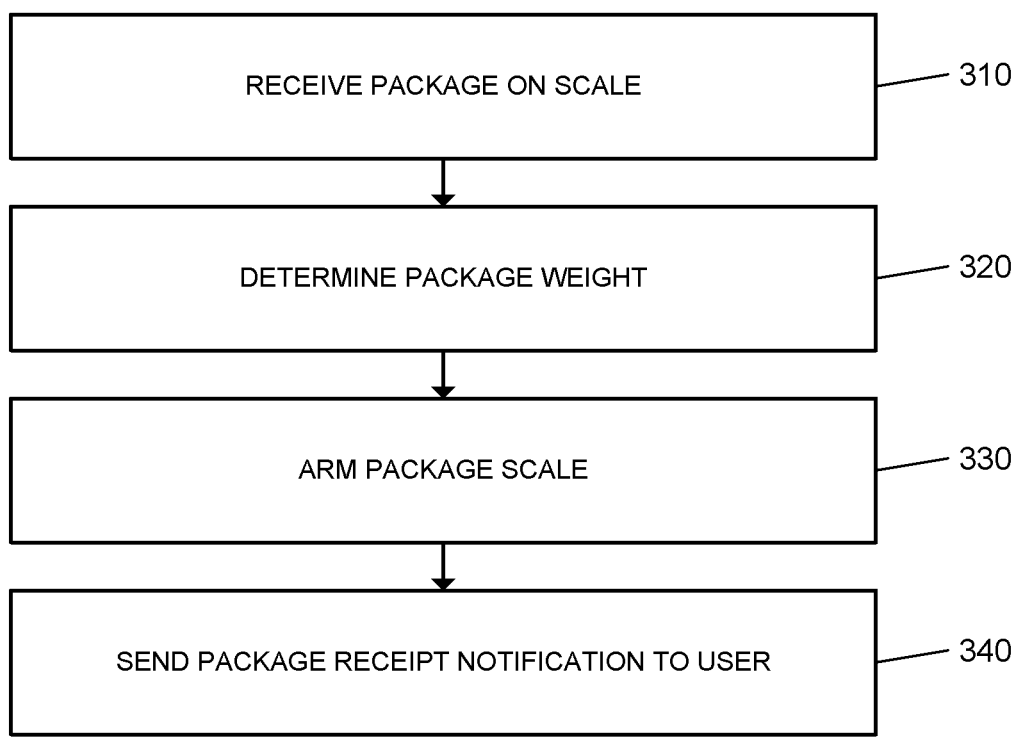
FIG. 3 is a flow chart of an example process for sending a package receipt notification to a user.

FIG. 3 illustrates an example process 300 for sending a package receipt notification to a user. The connected scale device receives a package (310). A delivery man may place a package on the connected scale device at an exterior of a monitored property. The connected scale device may be marked with signage that indicates to the delivery man to place the package on the scale. In some examples, the connected scale device may be equipped with a motion sensor that detects a person approaching the monitored property, and outputs an audible command to place the package on the scale. In other examples, an external camera at the monitored property may detect a delivery man approaching the monitored property, and may communicate with the control unit to prompt the connected scale device to output the command to place the package on the scale. The camera may distinguish the delivery man from a walker by based on detecting the delivery man's DIAD company issued device. For example, the camera may identify the delivery man's UPS DIAD device.

The connected scale device determines the weight of the package (320). The connected scale device may be an analog or digital scale, or may be a spring balance or load cell scale. The connected scale device may be configured to measure the weight of items placed on the sale accurately. The connected scale device may have the ability to measure the weight of items up to 400 lbs/180 kg. The connected scale device may measure the weight of items within a 0.2-0.5 lb accuracy. The connected scale device may not include a display that indicates the weight of the package to the delivery man or to the user. In some implementations, where the connected scale device is integrated with a monitoring system, the weight of the package determined by the scale is communicated to the control unit, and stored in memory. In other implementations, the determined weight of the package is stored locally at the connected scale device. In some examples, where one or more packages are delivered to the monitored property and placed on the scale, the connected scale device may remain in an armed status, and the weight of the additional packages placed on the scale are logged and stored at the scale and or communicated to the control unit.

The connected scale device changes its status to armed (330). When a connected scale device determines the weight of a package delivery on the scale, the status indicator LED on the scale changes from green to red indicating that the connected scale device is in an armed state. A package receipt notification is sent to the user (340). The package receipt notification may be sent by the control monitor to the user device of a user associated with the monitored property. The connected scale device may communicate to the control unit when a package is received on the scale and the weight of the package is determined. In some implementations, the control unit may be in communication with a monitoring server, which is in communication with a third party server associated with the sender of the package or the shipping service used to ship the package. In these implementations, the monitoring server may receive information, such as, which package was delivered and from which sender. For example, the sender Amazon may communicate an order number associated with a package, and FedEx may communicate the confirmation of delivery, delivery time, and shipping weight of the package to the monitoring server. The monitoring server may then communicate the sender and shipper information to the control unit. Based on the weight of the package communicated to the control unit, and the sender and shipper information received from the monitoring server, the control unit may confirm the particular package that was delivered to the monitored property. The package receipt notification may include the determined weight of the package, the sender of the package, the shipping details, and any other appropriate information about the particular package.

Figure 4:
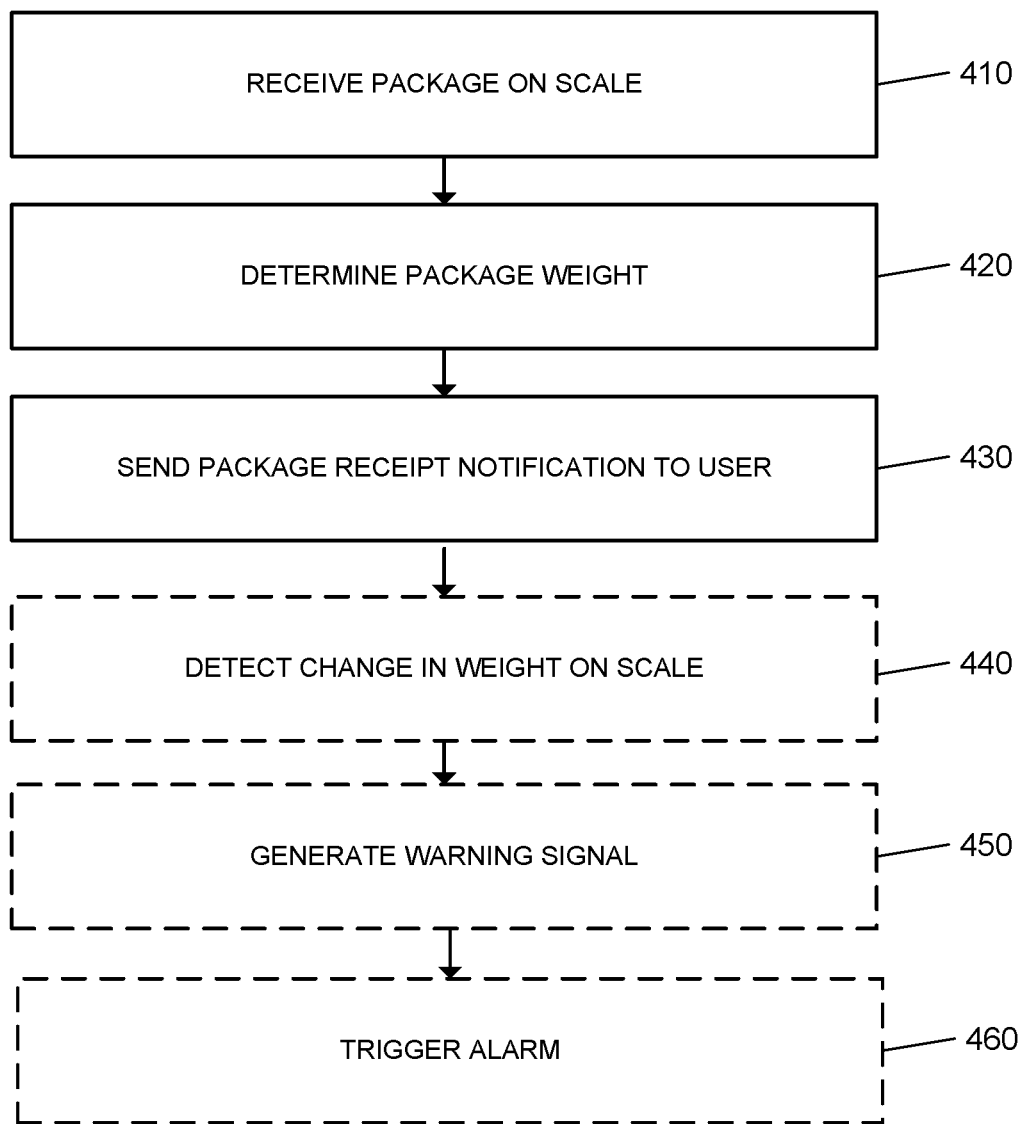
FIG. 4 illustrates an example process for triggering an alarm.

FIG. 4 illustrates an example process 400 for triggering an alarm. The connected scale device receives a package (410). A delivery man may place a package on the connected scale device at an exterior of a monitored property. The connected scale device may be marked with signage that indicates to the delivery man to place the package on the scale. In some examples, the connected scale device may be equipped with a motion sensor that detects a delivery person approaching the monitored property, and outputs an audible command to place the package on the scale. In other examples, an external camera at the monitored property may detect a delivery man approaching the monitored property, and may communicate with the control unit to prompt the connected scale device to output the command to place the package on the scale.

The connected scale device determines the weight of the package (420). The connected scale device may be an analog or digital scale, or may be a spring balance or load cell scale. The connected scale device may be configured to measure the weight of items placed on the sale accurately. For example, the connected scale device may have the ability, measure the weight of items up to 400 lbs/180 kg. The connected scale device may measure the weight of items within a 0.2-0.5 lb accuracy. The connected scale device may not include a display that indicates the weight of the package to the delivery man or to the user. In some implementations, where the connected scale device is integrated with a monitoring system, the weight of the package determined by the scale is communicated to the control unit and stored in memory. In other implementations, the determined weight of the package is stored locally at the connected scale device. In some examples, where one or more packages are delivered to the monitored property and placed on the scale, the connected scale device may remain in an armed status, and the weight of the additional packages placed on the scale are logged and stored at the scale and or communicated to the control unit.

A package receipt notification is sent to the user (430). The package receipt notification may be sent by the control monitor to the user device of a user associated with the monitored property. The connected scale device may communicate the determined weight of a package when the package is placed on the connected scale device. In some implementations, the control unit may be in communication with a monitoring server, which may also be in communication with a third party server associated with the sender of the package or the shipping service used to ship the package. In these implementations, the monitoring server may receive information, such as, delivery notifications for particular packages which include the delivery time and sender of each particular package. When the control unit determines a match between the weight of a delivered package and the weight of an expected package, the control unit may communicate to the connected scale device to change to an armed state. The status indicator LED on the connected scale device changes from green to red when the connected scale device is in an armed state.

The connected scale device detects a change in weight on the scale (440). While the connected scale device is configured to receive one or more packages and log the weight of each of the one or more packages based on the change in weight on the scale, detecting a decrease in the weight on the scale while the connected scale device is in an armed status may indicate someone attempting to steal a package. If a package is removed from the connected scale device while the connected scale device is in an armed state, the scale detects the change in the total weight and based on the magnitude of the change may determine which package was removed. The connected scale device may accept one or more packages when the connected scale device is already in an armed status, and may not generate an alarm. For example, the monitored property may receive one or more packages from one or more different shipping companies before the user is able to retrieve the packages off the scale. In these examples, the connected scale device may detect the increase in the weight on the scale for each of the of the one or more packages added, and may log the weight and delivery of the packages.

In some examples, where the detected decrease in weight does not correspond to the weight of one of the packages on the scale, the change in weight may be caused by a decrease in the weight of an item in the package. For example, a package may include dry ice, as the dry ice melts, the weight of the package may decrease over time. In these examples, when the connected scale device detects changes in weight that do not correspond to the weight of a package, the connected scale device may communicate with the control unit of the monitored property to switch on one or more cameras near the connected scale device. The one or more cameras may capture video recordings of the connected scale device, which may be communicated to the user device of the user. The user may review the captured video recording to verify that the packages on the connected scale device have not been tampered with.

In some other examples, a change in weight on the scale may be due to weather conditions. For example, windy conditions may cause a package to be blown off the scale partially. The connected scale device may detect a change in weight based on a portion of the package being on the scale. In some implementations, the monitoring server may receive external weather data and may communicate the received data to the control unit at the property. Based on the received weather data, the control unit may determine that a change in the weight on the sale may be expected due to windy conditions. The control unit may switch on one or more cameras near the connected scale device to capture video recordings. The control unit may communicate the received video recordings to the user device of the user. The user may review the captured video recordings to verify that at least one of the packages are partially on the scale, and may confirm to the control unit that the packages have not been tampered with.

The connected scale device generates a warning signal (450). The connected scale device may experience a brief delay before triggering an alarm based on detecting a change in weight on the connected scale device. When the connected scale device detects a change in weight on the connected scale device that corresponds to the weight of one or more packages being removed from the scale, the connected scale device may generate a warning signal to notify a person who may be attempting to steal the packages that the connected scale device is armed. In some examples, the connected scale device may generate a voice message. For example, the speaker of the connected scale device may output a voice message that indicates that the connected scale device is armed and if the packages are not replaced on the scale, an alarm will sound. In some examples, the connected scale device may beep, or the status indicator may flash, or any other suitable warning signal may be produced by the connected scale device.

The duration of the alarm delay period may be hard coded for the connected scale device, or in some implementations, the alarm delay period may be user configurable. In some implementations, the alarm delay period may be dynamically determined by the monitoring server and communicated to the control unit that communicated with the connected scale device. In these implementations, the monitoring server may be in communication with one or more other control units at one or more monitored properties, and may receive data from the one or more other control units. Based on the received data, the monitoring server may determine an alarm delay period that is appropriate based on recent package deliveries. The one or more control units may receive data indicating package thefts during a particular time and or within a particular zip code, and may determine an appropriate alarm delay period for a property within the zip code based on the data. For example, the alarm delay period may be shorter based on several package thefts occurring in a particular zip code.

The connected scale device triggers an alarm (460). The connected scale device triggers an alarm when the alarm delay period expires without the packages being replaced on the scale. In some implementations, the connected scale device communicates the expired alarm delay period to the control monitor, and the control monitor triggers a local alarm at the monitored property. For example, the control unit may trigger one or more indoor and outdoor lights to flash, or may trigger an indoor or outdoor siren. In some examples, the control unit may trigger a drone to be deployed from the monitored property to chase the individual that removed the one or more packages off the scale. The control unit may prompt one or more cameras at the monitored property to start capturing video recording and images of the area surrounding the connected scale device and the areas around the monitored property to attempt to capture images of the theft of the packages. The control unit may communicate the alarm event to the monitoring server, and the monitoring server may communicate to the one or more other control units of neighboring properties to capture video recording and images.

The monitoring server may also communicate with the user device of the user to notify the user of the alarm situation. In some examples, the notification may include details of the one or more stolen packages, and may include a live stream of the video recordings being captured by a camera at the monitored property. The monitoring server may communicate with one or more user devices of other user associated with neighboring properties to notify them of the alarm situation. The monitoring server may also communicate with the servers associated with the sender and the shipper notifying both of the theft. In some implementations, the monitoring server may employ automated audio, image, or video analysis from the captured date in real time to assist with identifying the thief. For example, facial recognition techniques may be used, license plate recognition, and any other suitable means of identifying the thief may be employed.

Figure 5:
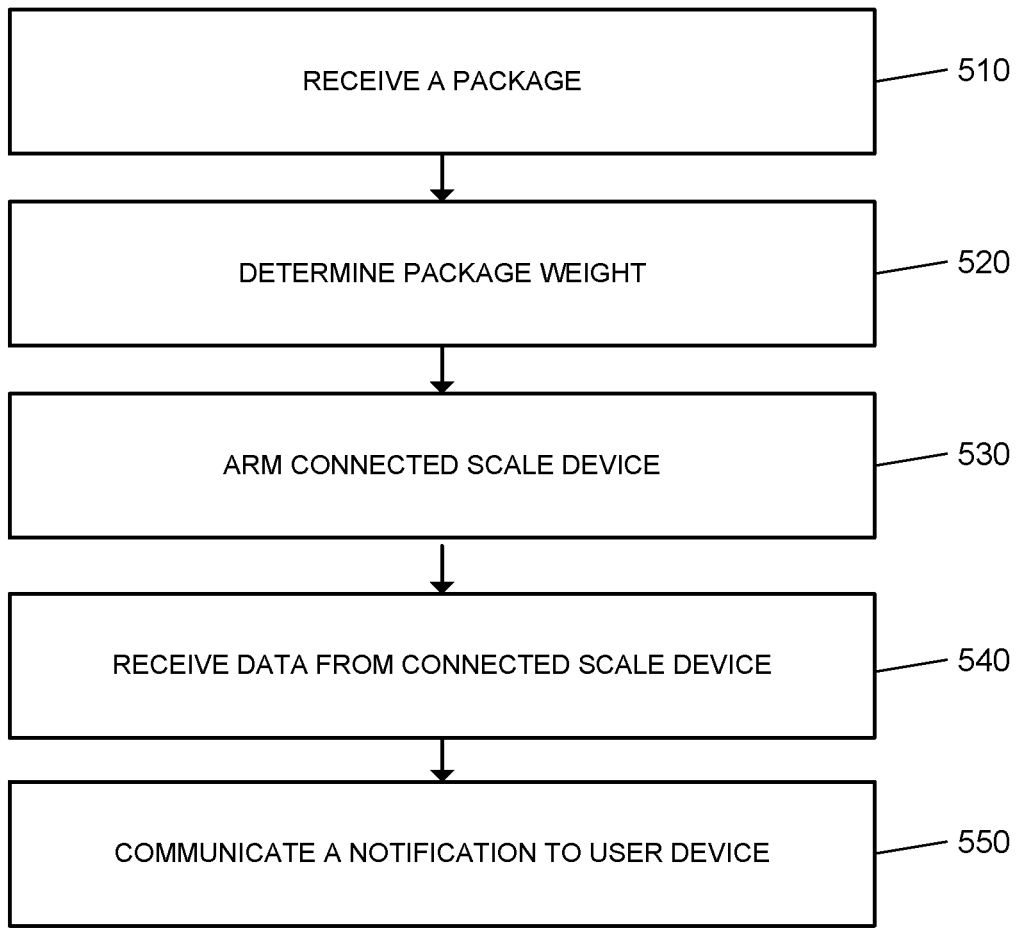
FIG. 5 is a flow chart of an example process for communicating a package receipt notification to a user device of a resident of a monitored property.

FIG. 5 illustrates an example process for communicating a package receipt notification to a user device of a resident of a monitored property. The connected scale device at the monitored property receives a package (510). The connected scale device may be located at the exterior of the front of the monitored property, and may include signage that notifies a delivery person to place deliveries on the connected scale device. The signage may indicate to person that an alarm will sound when a package is removed from the connected scale device before the device is disarmed. In some examples, the connected scale device includes a motion sensor that is configured to detect when a person approaches the connected scale. When the motion sensor of the connected scale device detects motion, the connected scale device may output a voice command indicating that deliveries should be placed on the connected scale device. In some examples, when the motion sensor detects motion in the vicinity of the connected scale device, the monitoring control unit automatically commands a camera in the vicinity of the connected scale device to capture image data.

The connected scale device determines a weight of the package placed on the connected scale device (520). The connected scale device may be any scale that is configured to accurately measure the weight of an item placed on the scale device. For example, the connected scale device may be an analog or a digital scale. In other examples, the connected scale device may be a spring balance or load cell spring scale. The connected scale device is armed based on the scale device receiving a package (530).

The monitoring control unit receives data indicating that the connected scale device received the package and the device is armed (540). The connected scale device communicates with the monitoring control unit that manages the monitoring system at the monitored property when a package is received. The connected scale device may communicate the weight of the delivered package, the time of delivery, and any other appropriate data to monitoring control unit. The monitoring control unit communicates a notification to a user device of a resident of the property based on receiving the data indicating that the connected scale received the package and the connected scale device is armed (550). The monitoring unit may communicate a text message to the user device of the resident indicating that a package was delivered on the connected scale device. In some examples, the package receipt notification may include the time of delivery and the weight of the package. In some implementations, when the monitoring control unit receives data from the connected scale device indicating that a package was received by the connected scale device, a camera that is located in the vicinity of the connected scale device may capture image data of the package on the scale device. In these implementations, the notification communicated to the user device of the resident may include one or more images of the package on the connected scale device.

In some examples, the resident at the property is expecting a package, and the monitoring control unit may receive shipping data associated with the expected package. The shipping data associated with the expected package may include the expected delivery date, the shipper, and the weight of the package. When a package is received on the date of an expected delivery, the monitoring control unit determines the delivered package is most likely the expected package based on the weight of the expected package matching the weight of the package received on the connected scale device. The monitoring control unit communicates a notification to a user device of a resident of the property indicating that the expected package was delivered to the property when the weight of the received package matches the weight of the expected package. In an example where the weight of the delivered package does not match the weight of the expected package, the monitoring control unit may communicate a notification to a user indicating that a package other than the expected package was received. In these examples, the package receipt notification may include image data of the package on the connected scale device.

In some examples, the user may be expecting more than one package. In these examples, the monitoring control unit may receive shipping data associated with one or more expected packages. When the connected scale device receives a first package on the day when two packages are expected, for example, the connected scale communicates the weight of the first package to the monitoring control unit. The monitoring control unit determines the delivered package is most likely one of the expected packages based on the weight of one of the expected packages matching the weight of the first package received on the connected scale device. When the first package is received on the connected scale device, the connected scale device is armed. When a second package is received on the connected scale device, the connected scale device remains armed, and detects the weight of the second package. The connected scale device communicates the new detected weight to the monitoring control unit, and the monitoring control unit determines the weight of the second package by subtracting the weight of the first received package from the new detected weight. The monitoring scale communicates a notification indicating that a second package was received on the scale device. In some examples, the notification may include the weight of the first received package, the weight of the second received package, and the combined weight of the package.

The armed connected scale device may be disarmed by a resident of the monitored property. The resident may enter the disarm code for the monitoring system into the control panel of the monitoring system to simultaneously disarm the monitoring system and the connected scale device. Based on the monitoring control unit confirming the disarm code entered by the resident matches a stored disarm code, the monitoring control unit disarms the monitoring system and the connected scale device. When the connected scale is disarmed, any change in weight detected on the scale does not generate an alert. In some examples, the resident may disarm the connected scale device by entering the disarm code for the monitoring system into a monitoring system application that runs on the user's device. In other examples, a specific disarm code may be used to disarm the connected scale device. The resident may enter the connected scale disarm code into the control panel of the monitoring system, and the monitoring control unit disarms the connected scale device based on the entered code matching a stored code. The resident may also enter the connected scale disarm code into the monitoring system application that runs on the user's device. In some implementations, the connected scale device may include a keypad on the device, the user may enter the connected scale device code into to the keypad to disarm the device.

In some other implementations, the connected scale device may automatically disarm when the resident moves the device into the monitored property. The connected scale device may include a tracker that is used to determine the location of the device when the device is removed from the monitored property. The connected scale device may be configured to generate an audible alarm when the device is moved to a location outside of a threshold distance from the monitored property. In some examples, the connected scale device may generate an alarm when the scale is moved.

When the connected scale device is armed and detects a change in the weight on the scale device, the connected scale device communicates the data indicating that there is a change in the weight of the package received on the device. The monitoring control unit compares the change in weight detected by the connected scale to a weight change threshold. The monitoring control unit may determine a weight change threshold based on the initial weight of the package. For example, when a package that weighs ten pounds is placed on the connected scale device, the monitoring control unit may determine that the weight change threshold is 0.5 pounds. The monitoring control unit may determine a weight change threshold using an algorithm that uses the weight of the package as an input.

In some implementations, when the connected scale device detects a change in the weight on the scale device, the monitoring control unit may command the camera in the vicinity of the connected scale device to capture image data. The monitoring control unit may analyze the captured image data to determine whether the package was removed from the scale, or moved so the package is partially on the scale.

The monitoring control unit may also analyze the captured image data to determine whether, at the time of the detected change in weight of the package on the scale, a person was in the vicinity of the connected scale device. In some implementations, the monitoring control unit may command a camera, that is a part of the monitoring system of a neighboring property, to capture image data. The monitoring control unit may communicate a notification to the user device of the resident of the property indicating that the package was stolen based on determining that the package was removed from the connected scale device while a person was in the vicinity of the device. The monitoring control unit may communicate a notification to the user device of a resident of the property indicating that the weather conditions likely caused the package to be either partially or fully removed from the connected scale device based on analyzing the image data captured from the camera in the vicinity of the device. The monitoring control unit may determine that weather conditions cause the package to move when a person is not captured in the image data at the time of the change in weight on the scale.

In some implementations, the connected scale device may receive weather data from a weather data server. The weather data server may be in communication with the monitoring control unit that manages the in-home monitoring system at the monitored property. In some examples, the connected scale device may be in communication with the weather data server. The weather data server may communicate weather data for the vicinity of the monitored property. For example, the weather data server may indicate that windy conditions are expected at the area of the monitored property. The connected scale may determine that weather likely caused the change in the weight reading based on receiving weather data that indicates windy conditions. The connected scale may detect an increase in the weight of a package on the scale during rainy conditions when the package may be soaked with rain. In these examples, the connected scale device receives weather data indicating rainy conditions and determines that weather likely caused the change in weight in the reading.

The monitoring control unit may command the connected scale device to output an alert when the package is removed from the connected scale device for a period of time greater than a threshold time. For example, the monitoring control unit may command the connected scale device to output an alarm thirty seconds after the package is removed from the connected scale. In examples where someone may pick up the package and then put the package back on the scale, the monitoring control unit may not command the connected scale device to output an alarm based on the packages being placed back on the scale within the threshold period of time. For example, when a person picks up the package and returns the package to the scale device within twenty seconds, the scale does not generate an alarm.

In some implementations, the connected scale device may be a stand alone device that is not in communication with a monitoring control unit. In these implementations, the user may use a connected scale device application, running on the user's device to control the connected scale device. The user may disarm and arm the connected scale device through the application. In these implementations, the connected scale device may include a keypad on the surface of the scale. The user may disarm and arm the connected scale by entering the disarm code in the keypad on the scale. The connected scale device may receive shipping data directly from one or more external servers. For example, the connected scale device may receive weather data from the weather data server, and may receive shipping data from the shipper of a package.

Figure 6:
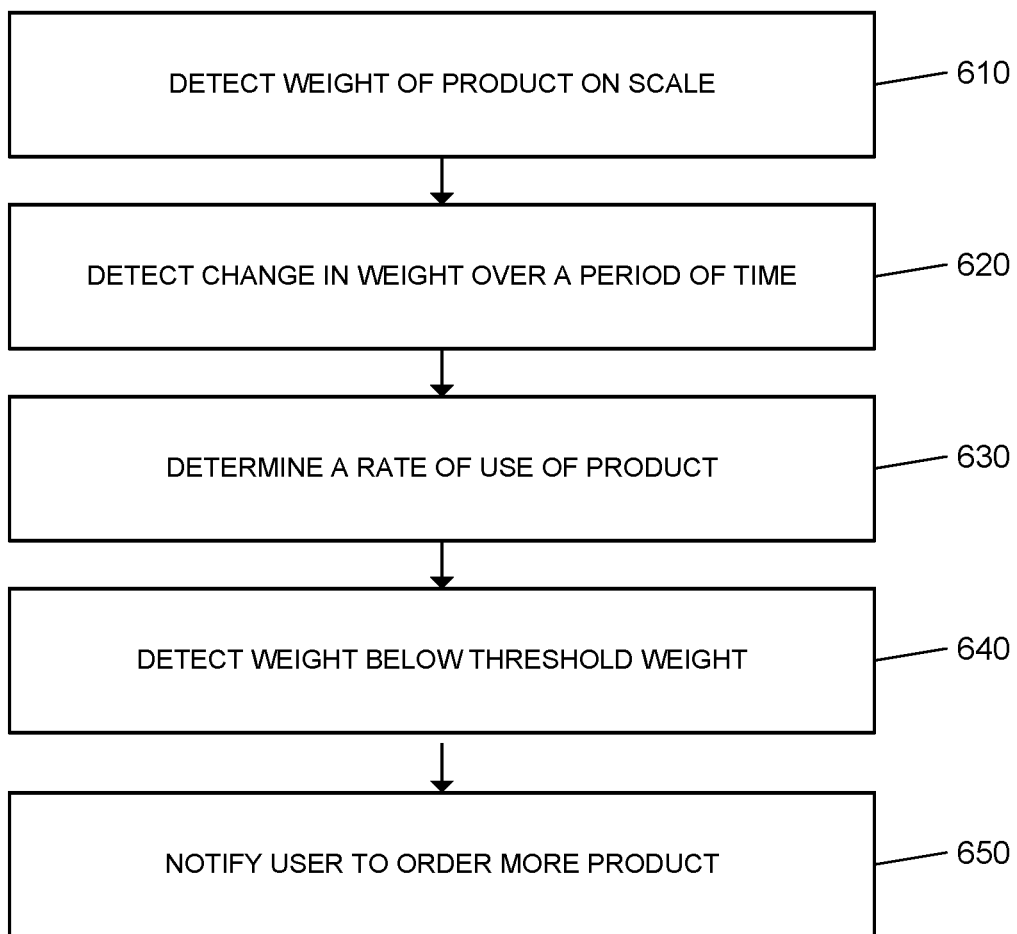
FIG. 6 is a flow chart of an example process for notifying a user to order more of a particular product.

FIG. 6 illustrates an example process for notifying a user to order more of a particular product. The connected scale device may be used to monitor the consumption of a product by the residents of a monitored property. In these examples, the connected scale device may be located in the monitored property, and the product to be monitored is placed on the connected scale device. For example, the resident user may place a full propane tank on the connected scale to monitor the use of the propane. In some examples, the connected scale device may be used to monitor supplies in a monitored business property. For example, a connected scale device may be used to monitor the consumption of coffee beans at a coffee shop. One or more connected scale devices may be used at a business to monitor the coffee beans, sugar, tea bags, or other product consumptions.

The connected scale device detects a weight of a product that is placed on the scale (610). The resident may place a new full bag of dog food on a connected scale device at the monitored property. The connected scale device detects the weight of the bag of dog food, and communicates the starting weight of the dog food to the monitoring control unit. The connected scale device detects a change in the weight of the product over a period of time (620). The connected scale device may detect the change in weight in the bag of dog food on the connected scale each time the user removed food from bag. For example, the connected scale device detects a change in weight in the bag of dog food each morning when the resident feeds the dog. The connected scale device may be calibrated to determine any appropriate change in weight of the product on the scale. The connected scale device communicates the weight data to the monitoring control unit.

The monitoring control unit determines a rate of use of the product on the connected scale device (630). The monitoring control unit receives the weight change data from the connected scale device each time the connected scale detects a decrease in weight. The monitoring control unit analyzes the first three or more detected weight changes to determine the rate of use of the product. The monitoring control unit may determine a daily rate of use of the product. In some examples, when the connected scale device is monitoring the use of propane in a propane tank, the monitoring control unit may determine an hourly rate of use for the propane when the tank is in use.

The connected scale detects a weight of the product on the scale that is below a threshold weight (640). The monitoring control unit may determine a threshold weight based on the rate of use of the product. The threshold weight may be based on a weight that indicates that more produce should be ordered. The monitoring control unit may also consider the time the new product would require to be delivered to the monitored property. The monitoring control unit may be in communication with an external server that manages the ordering of products and the delivery of products. For example, the monitoring control unit may be in communication with an Internet seller server to facility the user to order products from Internet seller. The monitoring server may determine a threshold weight based on determining how long the new product will take to arrive, and considering the old product should last until the new product arrives. When the connected scale detects the weight of the product is at or below the threshold weight, the connected scale device communicates the weight to the monitoring control unit.

The monitoring control unit notifies the user that the product is at or below the threshold weight (650). When the connected scale device detects the product is at or below the threshold weight, the monitoring control unit sends a notification to the user device of the resident of the monitored property. For example, the monitoring control unit may send an in application message to the user indicating that the weight of the product is at or below the threshold weight. In some examples, the notification may include the number of days of product that is left. For example, the message may include that there are 6 more days of dog food left. In some other examples, the notification may include the number of days for new product to arrive. For example, the message may indicate that it would take 4 days for the new bag of dog food to arrive.

In some examples, the monitoring control unit automatically orders more of the product when the product weight is at or below the threshold weight. In these examples, the monitoring control unit communicates with the external server to order the new product to the monitored property. When the connected scale device is used at a monitored business to monitor the use of products, the monitoring control unit can automatically order supplies for the business to assist with the operation of the business. The monitoring system at a business may be used to monitor the daily activity and use of products at the business. In some examples, presence detection and employee tracking data may be used to provide daily activity data to an owner of a business. The one or more sensors located throughout the monitored property may be used to detect when an employee is in a room of the property. For example, one or more motion detectors may detect an employee in the stock room followed by the connected scale device detecting a decrease in the stock of coffee beans in the stock room. The monitoring control unit may communicate this event as a notification to the owners of the business indicating that employee Jane stocked up the coffee beans at 2:00 pm.

In the examples where a connected scale device is used to monitor the use of propane at a monitored property, the monitoring control unit may use the connected scale device weight data, along with data received from one or more other sensors around the property to monitor for events. The monitoring control unit may monitor for an anomalies in the rate of use of the propane. For example, the monitoring control unit may receive data indicating that the propane tank is in use, based on the weight decrease of the propane, however, the one or more motion detectors in the room with the propane tank has not detected motion in over a threshold period of time. In these examples, the monitoring control unit may generate an alert indicating to the user that there may be a possible propane tank leak.

The monitoring control unit may monitor for anomalies in the rate of use of the dog food. For example, the monitoring control unit may not receive data indicating a decrease in the weight of dog food on a particular day, and based on this the monitor control unit may communicate a notification to the user device of the resident indicating that the dog may not have been feed for the day.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system that is configured to monitor a property, comprising:
   a connected scale device that is configured to generate weight data that indicates a weight of a product on the connected scale device and a timestamp that indicates a time that the weight data was generated; and
   a monitoring control unit that is configured to:
   receive, from the connected scale device, first weight data and a first timestamp that indicates a first time;
   receive, from the connected scale device, second weight data and a second timestamp that indicates a second time that is after the first time;
   analyze the first weight data, the second weight data, the first timestamp, and the second timestamp;
   determine a rate of change for the weight of the product based on analyzing the first weight data, the second weight data, the first timestamp, and the second timestamp; and
   determine a threshold weight of the product based on the rate of change for the weight of the product;
   receive, from the connected scale device, third weight data and a third timestamp that indicates a third time that is after the second time;
   based on the third weight data, compare a third weight of the product to the threshold weight;
   determine whether the third weight of the product satisfies the threshold weight of the product based on comparing the third weight of the product to the threshold weight; and based on determining whether the third weight of the product satisfies the threshold weight, determine whether to generate an instruction to order additional product.

2. The system of claim 1, wherein the monitoring control unit is configured to determine the threshold weight of the product based on the rate of change for the weight of the product by:
   determining a length of time required to receive an order of additional product; and
   predicting, based on the rate of change for the weight of the product, a weight of the product to be consumed during the length of time required to receive an order of additional product.

3. The system of claim 1, wherein the monitoring control unit is further configured to:
   communicate with an external server to order additional product;
   receive, from the external server, a confirmation for the order; and
   communicate, to a user device of the resident of the property, a notification including the confirmation for the order.

4. The system of claim 1, wherein the monitoring control unit is configured to:
   determine whether the third weight of the product satisfies the threshold weight of the product based on comparing the third weight of the product to the threshold weight by determining that the third weight of the product satisfies the threshold weight of the product; and
   determine whether to generate the instruction to order additional product by determining not to generate the instruction to order additional product based on determining that the third weight of the product satisfies the threshold weight of the product.

5. The system of claim 1, wherein the monitoring control unit is configured to:
   determine whether the third weight of the product satisfies the threshold weight of the product based on comparing the third weight of the product to the threshold weight by determining that the third weight of the product does not satisfy the threshold weight of the product;
   determine whether to generate the instruction to order additional product by determining to generate the instruction to order additional product based on determining that the third weight of the product satisfies the threshold weight of the product; and
   generate the instruction to order the additional product.

6. The system of claim 1, wherein the monitoring control unit is configured to:
   receive, from the connected scale device, fourth weight data and a fourth timestamp that indicates a fourth time is after the third time;
   receive, from the connected scale device, fifth weight data and a fifth timestamp that indicates a fifth time is after the fourth time;
   analyze the fourth weight data, the fifth weight data, the fourth timestamp, and the fifth timestamp;
   determine a second rate of change for the weight of the product based on analyzing the fourth weight data, the fifth weight data, the fourth timestamp, and the fifth timestamp; and
   determine a second threshold weight of the product based on the second rate of change for the weight of the product.

7. The system of claim 6, wherein the monitoring control unit is configured to:
   communicate, to a user device of a resident of the property, a notification indicating the second rate of change for the weight of the product.

8. The system of claim 7, wherein the notification indicating the second rate of change for the weight of the product includes a projected time for the product to be fully consumed.

9. The system of claim 1, wherein the monitor control unit is further configured to:
   receive, from the user device of the resident, a request for a current weight of the product;
   communicate, to the connected scale device, a request for the current weight of the product;
   receive, from the connected scale device, the current weight of the product; and
   provide, to the user device of the resident, a notification indicating the current weight of the product.

10. The system of claim 1, comprising:
    a sensor that is located at the property and that is configured to generate sensor data that reflects an attribute of the property,
    wherein the monitor control unit is configured to:
      analyze the sensor data;
      based on analyzing the sensor data, determine that a first user is in a vicinity of the connected scale device;
      based on determining that the first user is in the vicinity of the connected scale device, receive, from the connected scale device, fourth weight data;
      based on the third weight data and the fourth weight data, compare a fourth weight of the product to a third weight of the product;
      based on comparing the fourth weight of the product to a third weight of the product, determine the fourth weight of the product exceeds the third weight of the product;
      based on determining that the fourth weight of the product exceeds the third weight of the product and determining that the first user is in the vicinity of the connected scale device, determine that the first user likely performed a refill event; and
      store, in memory, a timestamp for the refill event.

11. The system of claim 1, wherein the monitoring control unit is configured to:
    receive, from the connected scale device, fourth weight data and a fourth timestamp that indicates a fourth that is after the third time;
    receive, from the connected scale device, fifth weight data and a fifth timestamp that indicates the fifth time is after the fourth time;
    based on the fourth weight data and the fifth weight data, compare a fourth weight of the product to a fifth weight of the product;
    based on comparing the fourth weight data to the fifth weight data, determine that the fourth weight data matches the fifth weight data;
    determine that a difference between the fourth time and the fifth time satisfies a threshold period of time;
    based on the fourth weight data matching the fifth weight data, determine that the product has not been used between the fourth time and the fifth time; and
    based on determining that the product has not been used between the fourth time and the fifth time and based on the difference between the fourth time and the fifth time satisfying the threshold period of time, communicate, to a user device of a resident of the property, a notification indicating that the product has not been used between the fourth time and the fifth time.

12. The system of claim 11, wherein the connected scale device is configured to:
receive data indicating that the product has not been used over the threshold period of time; and
output, from speaker, an audible alert.

13. A computer-implemented method comprising:
receiving, by a monitoring system and from a connected scale device that is configured to generate weight data that indicates a weight of a product on the connected scale device and a timestamp that indicates a time that the weight was generated, first weight data and a first timestamp that indicates a first time;
receiving, by the monitoring system and from the connected scale device, second weight data and a second timestamp that indicates a second time that is after the first time;
analyzing, by the monitoring system, the first weight data, the second weight data, the first timestamp, and the second timestamp;
determining, by the monitoring system, a rate of change for the weight of the product based on analyzing the first weight data, the second weight data, the first timestamp, and the second timestamp;
determining, by the monitoring system, a threshold weight of the product based on the rate of change for the weight of the product;
receiving, from the connected scale device, third weight data and a third timestamp that indicates a third time that is after the second time;
based on the third weight data, comparing a third weight of the product to the threshold weight;
determining whether the third weight of the product satisfies the threshold weight of the product based on comparing the third weight of the product to the threshold weight; and
based on determining whether the third weight of the product satisfies the threshold weight, determining whether to generate an instruction to order additional product.

14. The method of claim 13, wherein determining the threshold weight of the product based on the rate of change for the weight of the product comprises:
determining a length of time required to receive an order of additional product; and
predicting, based on the rate of change for the weight of the product, a weight of the product to be consumed during the length of time required to receive an order of additional product.

15. The method of claim 13, comprising:
communicating, by the monitoring system, with an external server to order additional product;
receiving, by the monitoring system and from the external server, a confirmation for the order; and
communicating, by the monitoring system, to a user device of the resident of the property, a notification including the confirmation for the order.

16. The method of claim 13, comprising:
determining, by the monitoring system, whether the third weight of the product satisfies the threshold weight of the product based on comparing the third weight of the product to the threshold weight by determining that the third weight of the product satisfies the threshold weight of the product; and
determining, by the monitoring system, whether to generate the instruction to order additional product by determining not to generate the instruction to order additional product based on determining that the third weight of the product satisfies the threshold weight of the product.

17. The method of claim 13, comprising:
determining, by the monitoring system, whether the third weight of the product satisfies the threshold weight of the product based on comparing the third weight of the product to the threshold weight by determining that the third weight of the product does not satisfy the threshold weight of the product;
determining, by the monitoring system, whether to generate the instruction to order additional product by determining to generate the instruction to order additional product based on determining that the third weight of the product satisfies the threshold weight of the product; and
generating, by the monitoring system, the instruction to order the additional product.

18. The method of claim 13, comprising:
receiving, by the monitoring system and from the connected scale device, fourth weight data and a fourth timestamp that indicates a fourth time is after the third time;
receiving, by the monitoring system, from the connected scale device, fifth weight data and a fifth timestamp that indicates a fifth time is after the fourth time;
analyzing, by the monitoring system, the fourth weight data, the fifth weight data, the fourth timestamp, and the fifth timestamp;
determining, by the monitoring system, a second rate of change for the weight of the product based on analyzing the fourth weight data, the fifth weight data, the fourth timestamp, and the fifth timestamp; and
determining, by the monitoring system, a second threshold weight of the product based on the second rate of change for the weight of the product.

19. The method of claim 18, comprising:
communicating, by the monitoring system and to a user device of a resident of the property, a notification indicating the second rate of change for the weight of the product.

20. The method of claim 19, wherein the notification indicating the second rate of change for the weight of the product includes a projected time for the product to be fully consumed.

* * * * *

UNITED STATES PATENT AND TRADEMARK OFFICE
CERTIFICATE OF CORRECTION

PATENT NO. : 10,612,960 B1
APPLICATION NO. : 16/383866
DATED : April 7, 2020
INVENTOR(S) : Alison Jane Slavin, Bret Jutras and Aaron Lee Roberts Page 1 of 1

It is certified that error appears in the above-identified patent and that said Letters Patent is hereby corrected as shown below:

In the Claims

In Column 24, Claim 11, Line 48, after "fourth" insert -- time --.

Signed and Sealed this
Thirtieth Day of June, 2020

Andrei Iancu
*Director of the United States Patent and Trademark Office*